Patented Nov. 8, 1938

2,136,144

UNITED STATES PATENT OFFICE 2,136,144

CATALYTIC OXIDATION OF NAPHTHENES

Nicholas A. Milas, Belmont, Mass., and William L. Walsh, East Greenbush, N. Y., assignors to Research Corporation, New York, N. Y., a corporation of New York No Drawing. Application August 28, 1937, Serial No. 161,528

7 Claims. (Cl. 260—451)

This invention relates to the controlled catalytic oxidation of naphthene hydrocarbons to the production of maleic acid or its anhydride, and other useful products.

In processes embodying the catalytic oxidation of organic compounds it is the usual, if not the invariable, practice first to vaporize the base compound and then pass a mixture of the vaporized compound and an oxygen containing gas into contact with a suitable catalyzer maintained at a temperature of from 350° to 600° C., thereby effecting a vapor phase reaction. The contact time in all such processes is necessarily low, usually of the order of 0.3 second or less, and the yields of the more valuable products, such as maleic acid, are in many cases quite unsatisfactory, particularly where the base compound is of a highly volatile character.

Moreover, as catalytic oxidations are highly exothermic and as the reaction is carried out wholly in the vapor phase, there is present at all times the latent heat of vaporization and the heat of reaction, in addition to the extraneous heat employed to maintain the catalyzer at the desired temperature, and consequently the total heat present results in high temperatures which frequently lead to violent explosions, causing considerable damage to the equipment and endangering the safety of the operator. Hence, it heretofore has been the usual practice to employ for the catalytic oxidation special means for maintaining the base compounds in vapor phase and special means for dissipating excess heat or for maintaining the reaction chamber at a temperature within a predetermined range.

It is an object of the present invention to provide an improved process for effecting the catalytic oxidation of naphthenic compounds of petroleums, by which process the aforementioned objectionable features inherent in the prior art catalytic oxidation processes are avoided. Another object of the invention is the provision of a process for the catalytic oxidation of naphthenic petroleums not involving the employment of extraneous heat other than for maintaining the catalyst at the desired temperature. Other objects include the provision of a process for catalytically oxidizing naphthenes to maleic acid and/or maleic anhydride, characterized by easy maintenance of a substantially constant temperature equilibrium; to provide a process, of the type aforesaid, which promotes oxidation without first having to vaporize the petroleum and then contact the vapor with the heated catalyst; and to provide catalytic oxidation of naphthenic petroleum at the minimum temperature consistent with satisfactory yield of the desired oxidation product.

These, and other, objects of invention are realized by the carrying out of the process according to which the naphthenic petroleum material to be oxidized if normally a liquid, is first passed through a stream of oxygen (or oxygen-containing gas) and is broken up to form a heavy spray so that each liquid particle may adsorb, entrap or otherwise annex as much oxygen as possible without effecting any appreciable vaporization of the compound; but where the compound is normally a solid, it is first prepared in a powder or granular form and then passed through a stream or atmosphere of oxygen in the form of a dispersion of discrete particles, in both cases the initial step being carried out at normal temperature (20° to 25° C.). The liquid or solid dispersion is then brought into direct contact with a suitable catalyzer which is maintained at the optimum temperature conditions for the particular compound and in an atmosphere containing oxygen in an amount ten to thirty times the theoretical equivalent of that necessary for complete oxidation.

The naphthenic material at the time of initial contact with the catalyzer immediately undergoes a partial oxidation which generates an appreciable amount of heat, which heat serves to raise the temperature of the oncoming unoxidized material.

The depth of catalyzer and rate of flow or feeding of the reaction mixture is such that a contact period of between 1 and 6 seconds (preferably approximating 1.5 seconds) is maintained. By applying the minimum amount of heat necessary to maintain the catalyzer at its proper temperature and by uniformly conducting the reaction mixture through the reaction zone, a substantially constant temperature equilibrium within the reaction zone may be established and maintained, thereby avoiding excessive temperatures and their attendant dangers and eliminating the necessity of using apparatus embodying cooling coils or expensive high temperature bath, such as mercury and molten sulphur, in order to dissipate the heat of the reaction.

The catalyst may comprise a compound containing one or more of the elements of the fifth or sixth groups of the periodic system, for example, vanadium, bismuth, molybdenum, tungsten, etc., which compounds may preferably form a coating on a carrier such as pumice, "Alundum", asbestos, fuller's earth, kieselguhr, or the like material.

A specific catalyst composition found to be operable for the satisfactory carrying out of the aforesaid process is that produced by precipitating vanadium pentoxide—or a mixture of vanadium pentoxide and molybdenum oxide—on pumice, as is described in greater detail in application Serial No. 38,050, filed August 27, 1935, for "Catalytic oxidation of organic compounds".

By the carrying out of the process aforesaid upon naphthenic petroleum material there is produced a reaction mixture containing useful products including carboxylic acids, the chief useful oxidation products being maleic acid and its anhydride.

As the starting material there may be used any petroleum material known to contain naphthenes. Thus, the process has been tried on, and found to be operable using, crude natural Mid-Continent petroleums, and fractions thereof, from the Oklahoma and Texas (Winkler) fields, and also naphthene-containing petroleums from Louisianan, Mexican, Venezuelan, Roumanian and Russian fields, and also the waxes derived from the oil deposits of the fields just mentioned. The operability of waxes marks the unique adaptability of the process of the present invention, since it is a fact that it is impracticable (and next to impossible) first to vaporize a petroleum wax and then catalytically oxidize the vapor.

While the invention is not restricted to the use of a particular and specific apparatus, it is preferred to use for the purpose the catalytic oxidation apparatus more specifically described in application Serial No. 38,050, filed August 27, 1935, for "Catalytic oxidation of organic compounds", which apparatus, in essence, comprises: an enclosed reaction chamber; a bed in the lower part of said chamber and containing a mass of the catalytic material; means for maintaining the catalytic material at a predetermined temperature; and means in the upper part of the chamber for conducting a current of gas and a dispersion of the material to be oxidized downwardly whereby the latter is brought into contact with the catalyst mass while in its original phase.

Illustrative of the process of the present invention the following specific data of experiments carrying out the above-described technique and catalytic procedure are given:

TABLE I

Oklahoma crude

| Samples | Optimum temp. of oxidation | Time (in seconds) of contact with catalyst mass | Percent yield of maleic acid |
|---|---|---|---|
| | °C. | | |
| Crude oil (not purified) | 410 | 1.6 | Over 10 |
| Various fractions of crude oil identified by boiling point range: | | | |
| 34-350° C. (sulphur products not removed) | 380-410 | 1.6 | 12.5+3%H₂SO₄ |
| 34-350° C. (free from sulphur products) | 380-410 | 1.6 | 14-16 |
| 78-150° C. (free from sulphur products) | 380-410 | 0.8 | 13-14.5 |
| 78-150° C. (free from sulphur products) | 320-410 | 1.6 | 15-21 |
| 78-150° C. (free from sulphur products) | 320-410 | 2.4 | 12-18.5 |
| 34-100° C. (free from sulphur products) | 470 | 0.4 | 6 |
| 34-100° C. (free from sulphur products) | 470-500 | 0.8 | 11-11.5 |
| 34-100° C. (free from sulphur products) | 410 | 1.6 | 13 |
| 34-100° C. (free from sulphur products) | 410 | 2.4 | 11 |
| 78-150° C. (recovered material and recirculated) | 410 | 1.6 | 20.5 |

TABLE II

Texas (Winkler) crude

| Samples | Optimum temp. of oxidation | Time (in seconds) of contact with catalyst mass | Percent yield of maleic acid |
|---|---|---|---|
| | °C. | | |
| Various fractions of crude oil identified by boiling point range: | | | |
| 36-150° C. | 380-440 | 0.8 | 6.5-11 |
| 36-150° C. | 380-410 | 1.6 | 9-13 |
| 36-150° C. | 380-410 | 2.4 | 10.5-13 |

In all cases in which two optimum temperatures were given above, the lower temperature corresponds to the lower yield recorded in the last column. The oxidation of both types of petroleum was studied also at temperatures above as well as below the limits given in the foregoing tables; as a result of these researches, it was found that operation at the above "optimum temperatures of oxidation" gave superior yields of maleic acid (and/or its anhydride) as opposed to operation at lesser or greater temperatures, other conditions being constant.

It will be appreciated that the above recited experiments were conducted on a laboratory scale. From the experience gained in the carrying out of the process of application Serial No. 38,050 both on laboratory scale and on a larger—more nearly "commercial"—scale, it has been found generally that yields of larger scale operations are higher than for the corresponding laboratory scale. Accordingly, it may reasonably be assumed that larger scale operation of the instant process will be attended by higher yields than the already satisfactory yields stated in Tables I and II above. This invention therefore will be seen to provide a process of producing maleic acid more cheaply than could have obtained in accordance with any known proposal for producing that product.

It is to be understood that the expression "naphthenic hydrocarbon mixture" as used in the appended claims is intended to include not only petroleums containing naphthenes but also isolated naphthene hydrocarbons.

This invention contains subject matter in common with application Serial No. 38,050.

We claim:

1. Process which comprises forming a non-gaseous dispersion of a liquid to solid naphthenic hydrocarbon in finely divided non-gaseous form in an atmosphere containing free oxygen, at normal room temperature; conveying said non-gaseous dispersion to a catalyst containing a compound of an element of the fifth and sixth groups of the periodic system and being maintained at a temperature between 180° and 500° C., whereby there is produced a reaction mixture containing a substantial amount of a maleic acid compound; and withdrawing the reaction mixture from contact with the catalyst.

2. Process which comprises forming a non-gaseous dispersion of a liquid to solid naphthenic hydrocarbon in finely divided non-gaseous form in an atmosphere containing free oxygen, at normal room temperature; conveying said non-gaseous dispersion to a catalyst containing a compound of an element of the fifth and sixth groups of the periodic system and being maintained at a temperature between 300° and 500° C., whereby there is produced a reaction mixture containing a substantial amount of a maleic acid compound; and withdrawing the reaction mixture from contact with the catalyst.

3. Process which comprises forming a non-gaseous dispersion of a liquid to solid naphthenic hydrocarbon in finely divided non-gaseous form in an atmosphere containing free oxygen, at normal room temperature; conveying said non-gaseous dispersion to a catalyst containing a compound of an element of the fifth and sixth groups of the periodic system and being maintained at a temperature between 300° and 500° C., contact with the catalyst being maintained for at least one second and not to exceed about six seconds, whereby there is produced a reaction mixture containing a substantial amount of a maleic acid compound; and withdrawing the reaction mixture from contact with the catalyst.

4. Process as defined in claim 1, characterized in that after the reaction mixture is withdrawn from contact with the catalyst maleic acid compound is recovered from the mixture and the residual mixture is recirculated over the catalyst.

5. Process as defined in claim 1, characterized in that a petroleum mixture containing a naphthene hydrocarbon is the material dispersed.

6. Process as defined in claim 1, characterized in that there is used as the material dispersed a fraction of naphthenic petroleum freed from sulphur compounds.

7. As a new product, a mixture of petroleum hydrocarbons and oxidized derivatives thereof including a substantial content of a maleic acid compound.

NICHOLAS A. MILAS.
WILLIAM L. WALSH.